Dec. 28, 1926.
H. HASTINGS
1,612,017
AUTOMATIC CONTROL
Filed Dec. 24, 1925    3 Sheets-Sheet 1
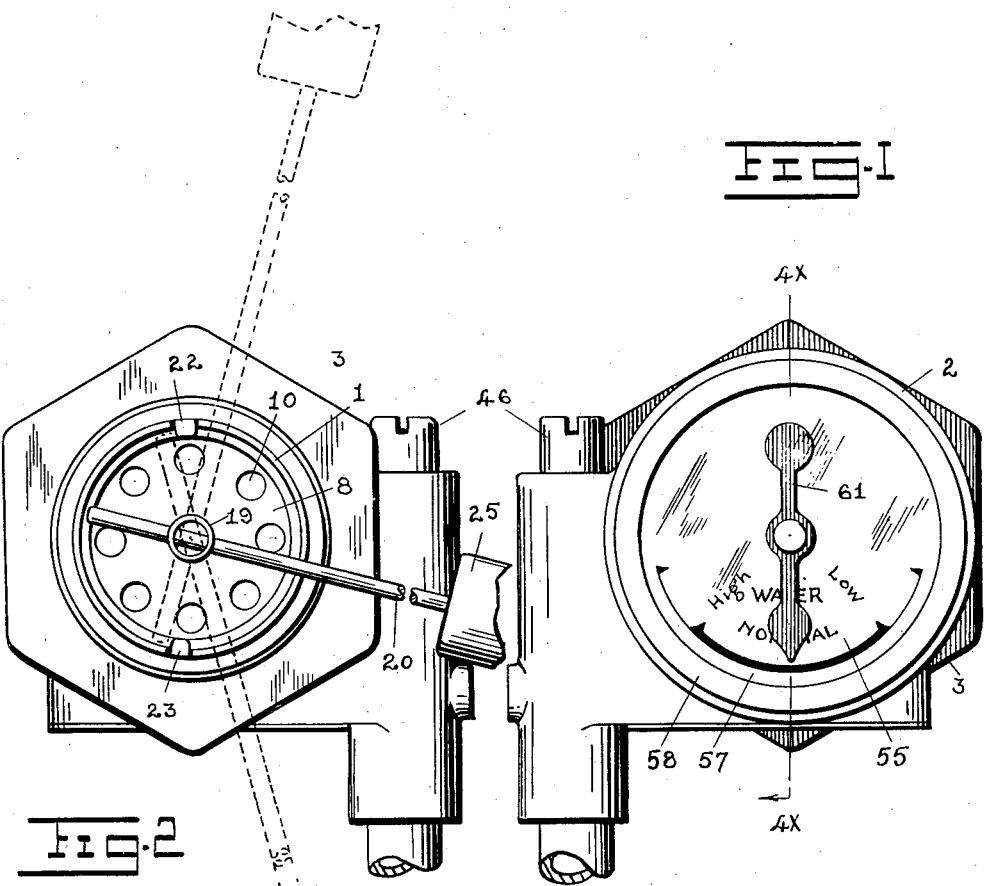
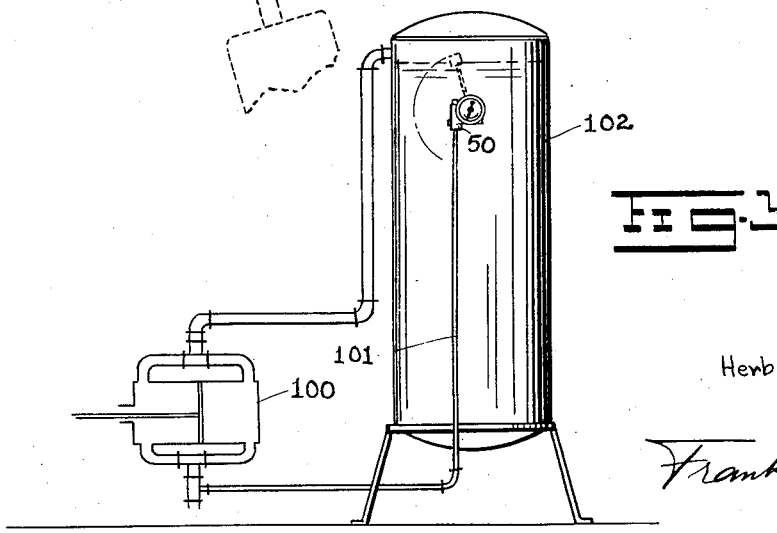
Inventor
Herbert Hastings
Frank Keiper
Attorney Dec. 28, 1926.
H. HASTINGS
AUTOMATIC CONTROL
Filed Dec. 24, 1925   3 Sheets-Sheet 2
1,612,017
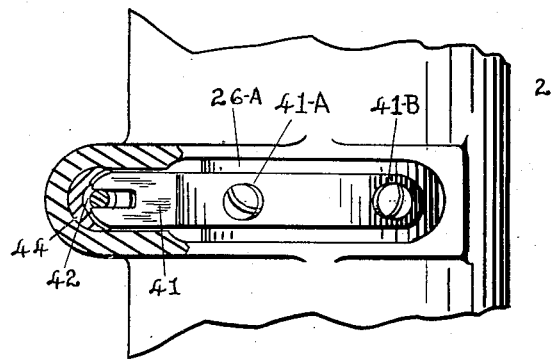
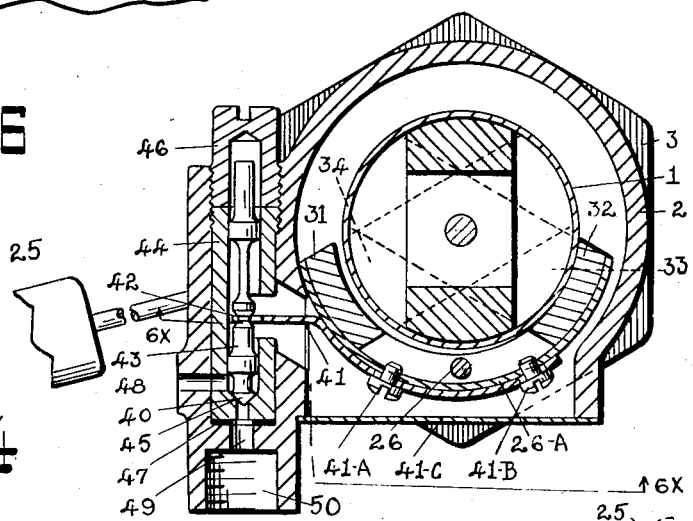
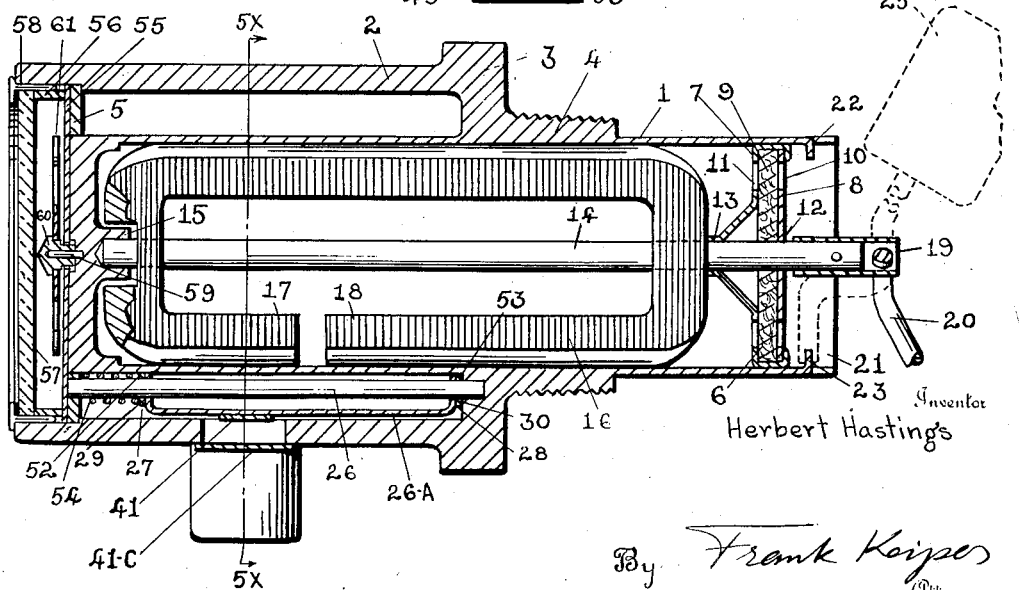
Inventor
Herbert Hastings
By Frank Keiper
Attorney Dec. 28, 1926.

H. HASTINGS

AUTOMATIC CONTROL 1,612,017

Filed Dec. 24, 1925   3 Sheets-Sheet 3

Inventor
Herbert Hastings

By Frank Keiper

Attorney

Patented Dec. 28, 1926.

1,612,017

UNITED STATES PATENT OFFICE.

HERBERT HASTINGS, OF ROCHESTER, NEW YORK.

AUTOMATIC CONTROL.

Application filed December 24, 1925. Serial No. 77,670.

This invention relates to the controlling device for maintaining an air supply in the storage tank of a water supply system and has for its object, to provide a controlling device for automatically maintaining a predetermined volume of air within the storage tank and thus maintain within the tank an air cushion under pressure of sufficient volume to maintain a constant pressure on the water and cause a substantially uniform flow in the water as it is drawn from the tank. It also is believed to have other uses.

Another object of this invention is to combine this controlling device with a level indicator for indicating the height of the level of the water within the tank.

Another object of this invention is to provide a primary operating member mounted within the tank and subjected to its pressure or operated on by the liquid level of the tank with means for operating secondary independent external operating members not subjected to the pressure within the tank without physically connecting them with the internal operating members through an opening in the wall of the tank.

Another object of the invention is to provide means for exhausting a surplus of air within a tank.

These and other objects of this invention will be fully illustrated in the drawings, described in the specification and pointed out in the claims at the end thereof.

In the accompanying drawings:

Figure 1 is a front elevation of the combined level indicator and automatic air controlling device.

Figure 2 is a rear elevation thereof.

Figure 3 is a diagrammatic view of a water tank and feed pump illustrating the application of my combined level indicator and automatic air controlling device thereto.

Figure 4 is a vertical longitudinal section of the indicator and controlling device, the section being taken on the line 4×—4× of Figure 1.

Figure 5 is a vertical cross section of the indicator and controlling device, the section being taken on the line 5×—5× of Figure 4.

Figure 6 is a partial horizontal section and bottom plan view of the device, the section being taken on the line 6×—6× of Figure 5, the cover plate provided at the bottom of the casing being omitted.

Figure 7:
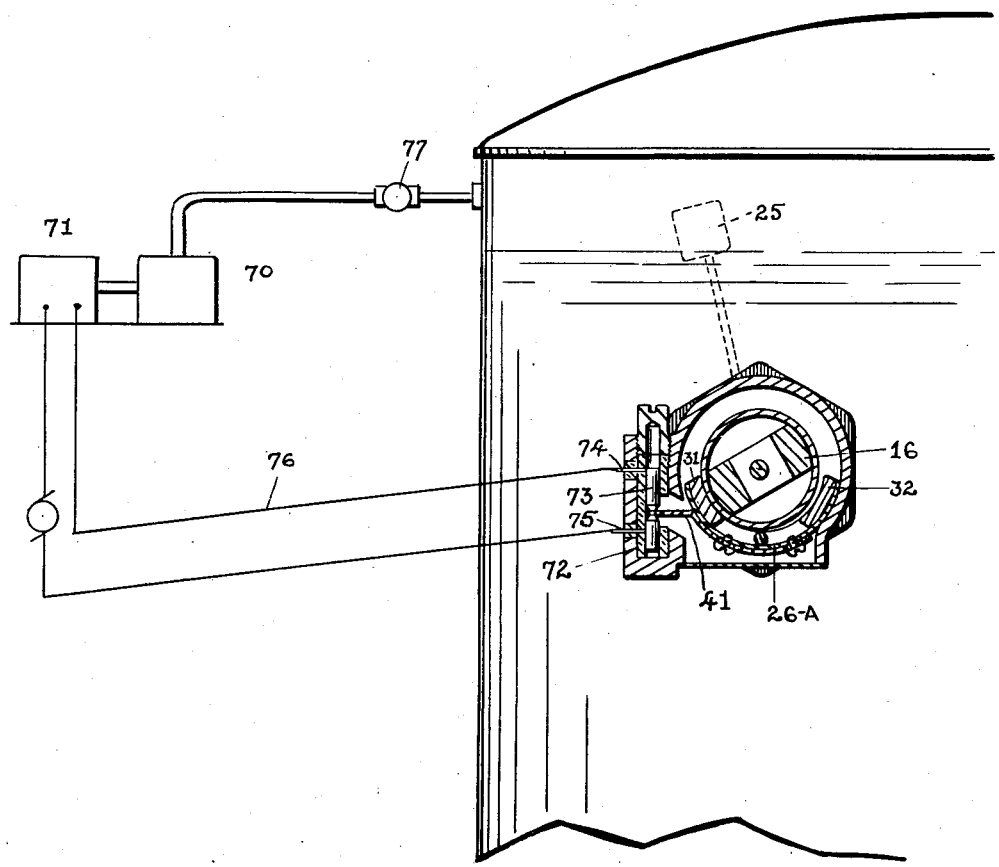
Figure 7 is a cross section of a modified form of the controlling device illustrated in connection with a diagrammatic view of a tank and electrically driven air pump controlled by the controlling device for the purpose of replenishing the volume of air within the tank.

Water supply systems designed on the pneumatic pressure principle employ an air tight storage tank into which the water is pumped by the feed pump. As the water is pumped into the tank the air space within it is gradually reduced until the air thus trapped therein is compressed to a predetermined point and exerts a constant pressure on the water stored within the tank. As soon as an outlet is opened to draw water from the tank the air within the tank expands and forces the water thru the outlet. The feed pump used in pumping the water into the storage tank is commonly provided with a control feature that automatically starts the pump as the pressure in the tank diminishes when the air expands in forcing the water out of the tank. This same control feature automatically stops the pump after it has built up the pressure in the tank to its maximum and replaced the water drawn from the tank.

In order to maintain a uniform supply of water at a substantially constant pressure it is, however, necessary to provide an air cushion within the tank that will in turn exert substantially constant pressure on the water within the tank. As water is drawn from the tank some of the air escapes with it and unless it is replaced, the air cushion gradually diminishes in volume with the result that the pressure can no longer be maintained constant or at best only for a very short time. In water systems of this type the volume of air forming the air cushion is, therefore, closely watched by means of the common gauge glass and as soon as the level of the water rises beyond a predetermined point indicating that the air cushion is being reduced or replaced by the water, an air inlet is opened by hand in the suction pipe so that the feed pump will pump a certain amount of air into the tank along with the water until the desired volume of air is restored in the tank as indicated by the level indicator. After enough air has thus been restored to the tank to complete its air cushion, the air inlet is shut off by hand allowing only water to be pumped into the tank by the pump and remains closed until it is again necessary to replenish the air cushion as above described.

In order to keep a water system of this type operating efficiently it is, therefore, necessary to closely watch the storage tank to keep a constant volume of air trapped above the level of the water.

The controlling device forming the subject matter of my present invention automatically takes care of the maintenance of the proper volume of air within the tank and keeps this volume constant within certain limits without the supervision by an attendant. As illustrated in the figures of the drawings the controlling device comprises the pressure tight housing 1 surrounded by a suitable casing 2 having the hexagon head 3 and threaded nipple 4 provided at the rear thereof. The rear portion of the housing 1 projects from the threaded nipple 4 of the casing and projects into the tank when the casing is threaded thereto by means of the nipple 4. The forward end of the housing 1 is closed and a ring 5 surrounds it to close the end of the space between the outside wall of the housing 1 and the inside wall of the casing 2. The housing 1 thus forms an impervious pressure proof wall between the internal operating member of the controlling device that is exposed to the pressure within the tank and the members of the mechanism mounted outside of housing 1 in the casing 2 that are operated by the operating member mounted within the housing 1.

The rear end of the housing 1 is closed by the head 6 which is built up of the cylindrical shell 7 and cover 8 between which a felt washer or diaphragm 9 is held in place. Both the cover and shell are provided with a series of perforations 10 and 11 respectively, and the central holes 12 and 13 forming a bearing in the head 6 for the oscillating shaft 14 to rotate therein. The felt washer or diaphragm 9 is perforated to allow the shaft 14 to pass therethru and form a packing for the shaft in this head. In the closed front end of the housing is provided the bearing 15 in which the forward end of the oscillating shaft 14 is mounted. The oscillating shaft 14 carries a rectangularly formed magnet 16 having its poles 17 and 18 located at the bottom near the forward end thereof as illustrated in Figure 4 of the drawings. This magnet is suitably fastened to the shaft and oscillates with it. The rear end of the shaft projects thru the head 6 and carries a sleeve 19 that is suitably fastened thereto. A rod 20 passes thru suitable holes in the sleeve 19 and one end of this rod is bent rearwardly parallel to the shaft 14 for a short distance and then outwardly and radially thereto within the circular flange 21 formed by the end of the magnet housing 1. From the flange are formed the lugs 22 and 23 which form stops for the end of the radially projecting end of the rod 20 which restrict the swinging of this end of the rod within the flange 21 to the distance between the two lugs 22 and 23.

The portion of the rod projecting from the opposite side of the sleeve 19 is bent outwardly and forms an arm which carries at its outer end the float 25. When the controlling device is mounted on the tank and the rear end of the magnet housing 1 projects into the inside thereof, the float 25 floats on top of the water and holds the oscillating shaft 14 and magnet 16 within the housing in a relatively angular position thereto. As the water rises and falls within the tank, the float moves up and down and swings the arm so as to oscillate the shaft 14 and magnet 16 to keep them in the same relative angular position with the float. The arc thru which the float swings from its highest to its lowest position is indicated in Figure 2, the two extreme positions of the float being illustrated in dotted lines in this figure. The lugs 22 and 23 prevent the float from swinging to a vertical position where it would likely dead center itself.

In the bottom of the casing 2 is mounted the shaft 26 having its ends suitably supported within the casing below the magnet housing 1. A cradle 26$^A$ in the form of a semi-circular channel is pivoted on the shaft 26 at 27 and 28, flanges 29 and 30 being bent up from the ends of the cradle and holes being provided therein to form suitable bearings for the cradle to rock on the shaft 26. At the top of the sides of the cradle are carried the armatures or magnets 31 and 32. Each of these armatures overlap the poles 17 and 18 of the magnet 16 on the outside of the housing when the magnet is turned so that the poles thereof are located opposite to the armature. The magnet housing 1 is made of a nonmagnetic material so that the lines of force extending from pole to pole of the magnet 16 are not intercepted but pass therethru and attract the armatures 31 and 32 when the magnet is turned to bring either one or the other of these armatures opposite to its poles.

The position of the magnet 16 in Figures 4 and 5 is shown intermediate of the armatures for the sake of clearness, but the armature 32 is shown attracted by it as if the magnet were located in the dotted line position indicated by reference numeral 33. As the magnet is oscillated from the dotted line position indicated by reference numeral 33 to the dotted line position indicated by reference numeral 34, the armature 32 is released and the armature 31 is attracted by the poles of the magnet. In this way the cradle in which the armatures 31 and 32 are carried is rocked as the magnet is turned on the rising and falling of the float 25. Thus when the float has dropped to its low position due to a low level of water within the tank which is due to the fact that the desired volume of air is trapped therein, the magnet is placed in the dotted line position indicated by reference numeral 33 or in a position close thereto and the armature 32 is attracted by it. The movement of the cradle on the attraction of the armature 32 is communicated to the needle valve 40. For this purpose a curved arm 41 is attached to the under side of the cradle 26^A. An opening is provided on the bottom of the casing 2 below the arm 41 of the cradle. In assembling the arm 41 is inserted thru this opening in the casing and attached to the cradle 26^A by means of the screws 41^A and 41^B. After the arm is properly mounted on the cradle the opening in the casing is closed by the cover 41^C. The arm 41 projects from the cradle to the needle valve and is bifurcated at its end as illustrated in Figure 6 so as to project into the annular groove 42 and straddle the reduced diameter of the needle valve stem 43. The needle valve is mounted to rise and fall within the sleeve 44 having the valve seat 45 provided at the lower end thereof. The sleeve 44 is located in a pocket forming part of the casing 2 and is held in place therein by the cap 46 that is threaded into the pocket on top of the sleeve 44. A packing ring 47 is placed between the end of the sleeve 44 and the bottom of the pocket to provide an air tight joint between them. Air is admitted thru the inlet 48 formed in the pocket and continued in the sleeve 44 and is regulated in its passage from this inlet to the outlet 49 by the needle valve 40. The outlet 49 is connected thru a suitable pipe threaded into the opening 50 in the casing to the intake of the feed pump 100 so that air admitted by the needle valve is pumped into the tank to replenish the air within it.

In the position in which the armatures are shown in Figure 5, armature 32 is shown attracted so that the cradle 26^A thru its arm 41 holds the needle valve 40 down on to its seat 45 and prevents air from passing thru the inlet 48 to the feed pump 100. As the armature 32 is only attracted when there is a sufficient volume of air within the tank as apparent from a predetermined low level of the water within the tank no air need be pumped into the tank by the feed pump and this position of the armature therefore keeps the air intake thru the needle valve closed as illustrated in Figure 5.

As the air within the tank is gradually exhausted the level of the water rises to take its place until the float 25 reaches a point where it has turned the magnet 16 to a point so that it attracts the armature 31. This attraction by the magnet of the armature 31 rocks cradle 26^A so that its arm 41 raises the needle valve 40 and keeps it raised to admit air into the feed pump 100 as it pumps water into the tank. The air thus pumped with the water into the tank gradually replenishes the air cushion until the volume of air in the tank again displaces the proper amount of water and lowers its level as a consequence thereof to the desired point. In lowering the level the float 25 oscillates the magnet until it attracts the armature 32 which rocks the cradle to close the needle valve to prevent more air from being pumped into the tank. The connection between the needle valve and the feed pump is diagrammatically illustrated in Figure 3 in which reference numeral 100 indicates the feed pump, 101 the connecting pipe leading from the regulating device mounted on the tank 102. In order to prevent the armatures from being moved too early by the magnet, that is before the poles of the magnet have been moved opposite the armature or very nearly so, the cradle 26^A is retarded by means of a pair of friction washers 52 and 53 located one on the outside of each end of the cradle. An expansion spring 54 surrounding one end of the shaft 26 is placed between the washer 52 and the ring 5 of the casing and forces the friction washer 52 against one end of the cradle and the other end of the cradle against the friction washer 53. In this way sufficient friction is created between the washers and the ends of the cradle to retard the rocking movement of the cradle until the magnet has been moved to a position where a sufficient number of the magnetic lines of force of the magnet pass through the armature to overcome the friction and attract the armature to rock the cradle.

The level of the water is indicated by the hand 61 and indicator dial 55. The dial is placed on the outside of the head of the casing, being held against it by the spacing ring 56. The glass 57 is placed against the spacing ring and in turn is held in place in the casing by the bezel 58. In the center of the head 5 is mounted the pivot pin 59 on which the cap 60 is provided. This cap forms the center bearing for the magnetic hand 61 of the level indicator. The hand being magnetic acts as a compass needle and turns with the magnet 16 indicating on the dial the level of the water within the tank.

The device thus operates to automatically provide the air cushion within the tank with a sufficient volume of air as well as indicates on the outside of the tank the level of the water within the tank.

A modification of the controlling device is illustrated in Figure 7. The air for maintaining the volume of air within the pressure tank in this case is supplied by the air pump 70 driven by the electric motor 71. The operation of this electrically driven pump is controlled by a switch embodied in the controlling device in place of the air inlet valve described and illustrated in connection with Figures 1 to 6 inclusive. This switch is mounted in the pocket of the casing 2 and comprises a sleeve 72 in which the sliding rod 73 is mounted. In the sleeve 72 are provided two contacts 74 and 75 which are spaced apart so that the sliding rod can provide an electrical connection when placed in one position and break this connection when placed in another position. For this purpose the sliding rod is engaged by the arm 41 mounted on the cradle 26ª in the same manner as the valve stem 43 of the air valve. The movement of the armatures thus operates to raise or lower the sliding rod 73 within the sleeve 72 making electrical connection when the sliding rod is raised as illustrated in Figure 7. In this position the level of the water within the tank is "high" and has raised the float 26 to the "high" position. In moving to this position the float has moved the magnet 16 to the position indicated in Figure 7 and has attracted the armature 31. In so doing it has raised the sliding rod 73 as above pointed out to make the electrical connection between the two contacts 74 and 75. In making the electrical connection the motor circuit 76 is closed and starts the motor 71 which in turn drives the pump 70 to replenish the air cushion within the tank which has become partially exhausted as indicated by the high level of the liquid within the tank. After the air within the tank has been replenished by the pump and its volume increased to a point where the water displaced by it brings the level of the water back to a "low" position the float drops correspondingly and oscillates the magnet 16 to a position where it attracts the armature 32 and lowers the sliding rod to break the connection between the contacts 74 and 75. The motor and the pump then stop so that no more air is pumped into the tank. A check valve 77 is placed in the air line leading from the pump to the tank to prevent the air from being forced back into the pump after the pump has stopped pumping.

The controlling device has so far only been described as applied to pressure tanks for the purpose of replenishing the air cushion within the tank. It is, however, equally applicable to pressure tanks for the purpose of replenishing the liquid therein. For example the water level in steam boilers must be kept at a predetermined level and as the water is being constantly changed into steam and is being used up it is necessary to replenish the water at frequent intervals. This is done manually by the attendant who has charge of the boiler. The modified controlling device as illustrated in Figure 7 can be used to do this automatically by using a water pump instead of the air pump and arranging the contact points of the switch so that the float operates to close the circuit on a low level to start the pump and open the circuit on a high level. To stop the pump in this way the level of the water can be kept constant irrespective of the pressure and volume of the steam within the boiler. While I have shown my apparatus used in connection with pumps, it is understood that the controlling mechanism will function equally well with other apparatus used in place of pumps.

Figure 8:
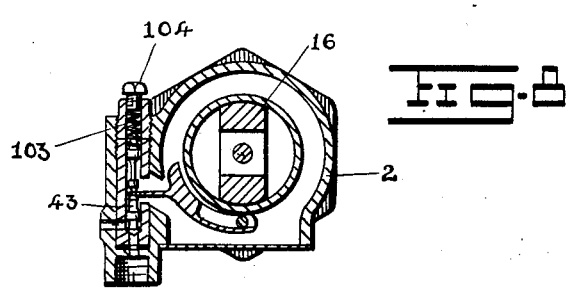
Figure 8 illustrates another modified form of the controlling mechanism.

The controlling mechanism as described above and illustrated in the drawings is provided with two armatures or magnets, but obviously the same results may be accomplished by a controlling mechanism having but one armature or magnet. In this case the valve or switch of the mechanism may be opened on the attraction of the single armature by the magnet when turned by the float and closed on the release of the armature by the magnet which will allow the armature to drop back by gravity or be forced back by means of a spring previously compressed on the attraction of the armature in opening the valve. This modification is illustrated in Figure 8 the spring for returning the magnet or closing the valve being placed on top of the needle valve and indicated by reference numeral 103. The tension of this spring may be increased or decreased by the cap screw 104 which is threaded into the top of the valve.

I claim:

1. In a device for automatically maintaining a volume of air within liquid pressure supply tanks, means mounted within the tank and operated on the increase or decrease of the volume of water within the tank and means controlled magnetically through the wall of the tank by said first named means to admit air into the tank.

2. In a device for automatically maintaining a volume of gas within liquid pressure tanks, a magnet located within the tank and operated by the rising and falling level of the liquid and means located without the tank and controlled magnetically by said magnet to admit air into the tank.

3. In a device for automatically maintaining a volume of air within liquid pressure supply tanks, means mounted within said tank and operated by the rising and falling level of the liquid within the tank, means for forcing air into said tank, and means magnetically controlled through the wall of the tank by said first named means to automatically control said second means to replenish the air escaping from the tank.

4. In a device for automatically maintaining a volume of air within liquid pressure supply tanks, a float mechanism, an air control valve and means magnetically controlled through the wall of the tank by said float mechanism to admit air into the tank thru said air control valve.

5. In a device for automatically maintaining a volume of air within liquid pressure supply tanks, the combination of a float, an air control valve, and magnetic means controlled by said float through the wall of the tank to open and close said air control valve.

6. In a device for automatically maintaining a volume of air within liquid pressure supply tanks, the combination of a float mechanism, means for supplying air to said tank under pressure and magnetic means controlled by said float mechanism to magnetically operate said air supply means through the wall of the tank to admit air into the supply tank.

7. In a device for automatically maintaining a volume of air within liquid pressure supply tanks, the combination of a float member, a magnet operated by said float member, and an inlet control member operated by said magnet.

8. In a device for automatically maintaining a volume of air within liquid pressure supply tanks, the combination of an imperforate housing connected to the tank, a magnet mounted within said housing, a float connected to said magnet to shift its poles on the rising and falling of the level of the liquid within said tank, and an air control member mounted outside of said housing and operated by said magnet.

9. In a device for automatically maintaining a volume of air within liquid pressure supply tanks, the combination of an imperforate housing connected to said tank and having its inside exposed to the pressure within the liquid pressure supply tank, a magnet mounted within said housing, a float floating on the liquid within the tank and connected to said magnet to shift the poles of said magnet on the rising and falling of the level of the liquid in the tank, an armature mounted on the outside of said casing, said armature being operated by said magnet on the shifting of its poles and means operated by said armature to admit air into the liquid pressure supply tank.

10. In a device for automatically maintaining a volume of air within liquid pressure supply tanks, the combination of a pressure sustaining housing connected to said tank, a magnet mounted within said pressure housing, a float mounted within the tank and connected to said magnet, said float moving said magnet to shift its poles on the rise and fall of the liquid within the tank, a valve operated by the magnetic flux of said magnet.

11. In a device for automatically maintaining the contents of pressure tanks at a predetermined volume, the combination of a magnet, a float mounted within said tank and connected to said magnet to shift its poles on the rise and fall of the level of the liquid within the tank, an inlet controlling member operated by said magnet, said inlet controlling member controlling the supply for the pressure tank to keep its contents at a predetermined level.

12. In a device for automatically maintaining a volume of air within liquid pressure tanks, the combination of a pressure resisting housing connected to the tank, a magnet mounted within said housing, a float within the tank and connected to said magnet to shift the poles of the magnet on the rising and falling of the level of the liquid within the tank, a cradle mounted on the outside of said housing, a pair of armatures carried by said cradle, said magnet alternately attracting and releasing said armatures and moving said cradle on the shifting of the poles of the magnet, and a control member operated by said cradle, said control member regulating the admittance of air into the tank.

13. In a device for automatically maintaining a volume of air within liquid pressure tanks, the combination of a pressure resisting housing connected to said tank, a magnet mounted within said housing, a float within the tank and connected to said housing, and an armature on the outside of said housing and being alternately attracted and released by the poles of said magnet, and a control member connected to said armature, said control member regulating the admittance of air into the tank.

14. In a device for automatically maintaining a volume of air within liquid pressure tanks, the combination of a pressure resisting housing connected to said tank, a magnet mounted within said housing, a float within said tank and connected to said magnet to shift the poles of said magnet, an armature provided on the outside of said housing and being attracted and released by said magnet on the shifting of the poles thereof, an air inlet valve, means connecting said armature with said air inlet valve to open and close said valve to admit a volume of air into the tank to replenish the air escaped therefrom.

15. In a device for automatically maintaining a volume of air within pressure tanks, the combination of a pressure resisting housing connected to said tank, a magnet mounted within said housing, a float mounted in said tank and connected to said magnet, an armature on the outside of said housing, and arm attached to said armature a control member connected to said arm, said control member being operated on the movement of said armature.

16. In a device for automatically maintaining a volume of air within liquid pressure tanks, the combination of a pressure resisting housing connected to said tank, a magnet mounted within said housing, a float within said tank and connected to said magnet, a cradle mounted to rock on the outside of said housing, an armature carried by said cradle and adapted to be attracted and released by said magnet within said housing to rock the cradle on the outside thereof, an arm carried by said cradle, and a valve, said arm engaging said valve to open and close it on the rocking of said cradle.

17. In a device for automatically maintaining a volume of air within a liquid pressure supply tank, the combination of a housing connected to said tank, a magnet mounted within said housing, a float within said tank and connected to said magnet, a cradle mounted on the outside of said housing, an armature carried by said cradle, said cradle being moved on the attraction and release of said armature by said magnet, a valve, a valve stem within said valve and means connecting said valve stem with said cradle to raise and lower said valve stem on the attraction and release of said armature by said magnet.

18. In a device for automatically maintaining a volume of air within a liquid pressure supply tank, the combination of a housing, a magnet mounted to oscillate within said housing, a float within said tank and connected to said magnet to oscillate said magnet on the raising and lowering of the level of the liquid within the tank, a casing surrounding said housing, a cradle mounted to rock in said casing on the outside of said housing, a pair of armatures carried by said cradle, said armatures being alternately attracted and released by said magnet on the oscillation thereof to rock said cradle, and means operated by said cradle to control the admission of air into said tank.

19. In a device for automatically maintaining a volume of air in a liquid pressure supply tank, the combination of a housing connected to said tank, a magnet having its poles facing each other mounted to oscillate within said casing, a float within said tank and connected to said magnet, a pair of armatures on the outside of said casing and located to have the poles facing each other mounted to oscillate within said casing, a float within said tank and connected to said magnet, a pair of armatures on the outside of said casing and located to have the poles of said magnet placed alternately opposite to them on the oscillation of said magnet, a cradle connecting said armatures, a rock shaft for said cradle and an air intake valve operated by said cradle to control the admission of air into the tank.

20. In a device for automatically maintaining a volume of air in a liquid pressure supply tank, the combination of a housing connected to said tank, a magnet mounted to oscillate in said housing, a float in said tank connected to said magnet, a casing surrounding said housing, a rock shaft mounted in said housing, a cradle mounted to rock on said rock shaft, a pair of armatures carried by said cradle one at each side thereof, said armatures being parallel to said magnet and being located so as to have the poles of said magnet alternately move opposite each of said armatures on the oscillation of said magnet, an air valve having a valve stem, an arm connecting said cradle with said valve stem to raise or lower said valve stem on the rocking of said cradle.

21. In a device for automatically maintaining a volume of air in a liquid pressure supply tank, the combination of a magnet, a float for moving said magnet on the rising and falling of the level of the liquid within the tank, a pair of armatures, a cradle connecting said armatures, a shaft, said cradle mounted to rock on said shaft on the alternate attraction and release of said armatures by the poles of said magnet, and a friction member engaging said cradle to retard the rocking motion thereof.

22. In a device for automatically maintaining a volume of air in a liquid pressure supply tank, the combination of a loop shaped magnet having its poles opposed to each other on one side thereof, a pair of armatures, a cradle connecting said armatures, a shaft, said cradle mounted to rock on said shaft, and means for oscillating said magnet on the rising and falling of the level of the liquid in said tank to alternately have said armatures overlap the poles of said magnet and be attracted by the electromagnetic field between the poles.

23. In a device for automatically maintaining a volume of air in a liquid pressure supply tank, the combination of a loop shaped magnet having its poles opposed to each other on one side thereof, a pair of armatures, a cradle connecting said armatures, a shaft, said cradle mounted to rock on said shaft, and means for oscillating said magnet on the rising and falling of the level of the liquid in said tank to alternately have said armatures overlap the poles of said magnet and be attracted by the electromagnetic field between the poles, and a nonmagnetic separating wall interposed between said armatures and said magnet.

24. In a device for automatically maintaining a volume of air in a liquid pressure supply tank, the combination of a rectangularly loop shaped magnet having its poles opposed to each other at one side thereof, a pair of armatures mounted to rock toward and away from said magnet, a magnetic needle pivoted near one end of said magnet to indicate the relative movement and position of said magnet.

25. In a device for automatically maintaining a volume of air in a liquid pressure supply tank, the combination of a magnet, a float within said tank and connected to said magnet to shift the poles of said magnet, means operated by said magnet on the shifting of the poles to admit air into the tank, and means operated by said magnet to indicate the level of the liquid within the tank as determined by the position of the float within the tank.

26. In a device for automatically maintaining a volume of air within liquid pressure supply tanks, the combination of a pressure housing connected to said tank, a magnet mounted within said pressure housing, means acted upon by the rise and fall of the liquid within the tank for controlling the movement of the magnet, a controlling member operated by the magnet flux of said magnet and means operated by said controlling member to replenish the air within said tank.

27. In a device for automatically maintaining a volume of air within a liquid pressure supply tank, the combination of a housing connected to said tank, a magnet mounted within said housing, a float within said tank and connected to said magnet, an armature mounted on the outside of said housing, said armature being moved on the attraction and release by said magnet, a valve, a valve stem within said valve and means connecting said valve stem with said armature to raise and lower said valve stem on the attraction and release of said armature by said magnet.

28. In a device for automatically maintaining a volume of air in a liquid pressure supply tank, the combination of a magnet having its poles opposed to each other at one side thereof, an armature mounted to rock toward and away from said magnet, a magnetic needle pivoted near one end of said magnet to indicate the relative movement and position of said magnet.

29. In a device for automatically controlling the relative volumes of gas and liquid in a tank, an imperforate pressure chamber, a magnet within said chamber and operated by the liquid within the tank, and an armature on the outside of said chamber for controlling the admission of gas into said tank.

30. In a device for automatically controlling the relative volumes of gas and liquid held under pressure in a tank, a magnet operated by the liquid within the tank and subjected to the pressure thereof, and an armature on the outside of said tank operated by said magnet for controlling the admission of gas into the tank.

31. In a device for automatically maintaining a predetermined liquid level with an air space above it within pressure tanks, means operated on the increase or decrease of liquid within the tank, an imperforate pressure confining casing connected to said tank and surrounding said means, and means controlled through the imperforate and rigid walls of said pressure confining casing by said first named means.

32. In a device for automatically maintaining a predetermined liquid level with an air space above it within pressure tanks, means located within the tank and operated on the increase or decrease of the volume of liquid within the tank, and means located outside of the tank for controlling the admission of air into the tank, said second named means being operated on the movement of said first named means through a magnetic field penetrating the imperforate and rigid wall separating said first named means from said second named means.

33. In a device for automatically maintaining a predetermined liquid level with an air space above it within pressure tanks, means operated by the rising and falling level of the liquid within the tank, an imperforate closure surrounding said means, means for forcing air into said tank and means operated by said first named means to automatically control said second means to replenish the air escaping from the tank.

34. In a device for automatically controlling the relative volumes of gas and liquid in a tank, means operated by the liquid within the tank for controlling the admission of gas to the tank, and an imperforate housing surrounding said means.

35. In a device for automatically maintaining a predetermined liquid level with an air space above it within pressure tanks, the combination of a pressure resisting housing connected to said tank, a magnet within said housing, a float mounted in said tank and actuating said magnet and an armature on the outside of said housing.

36. In a device for automatically maintaining a predetermined liquid level with an air space above it in a pressure tank, the combination of a magnet, an armature mounted to rock at a point relative to the poles of said magnet and means for oscillating said magnet on the rising and falling of the level of the liquid in said tank to operate said armature.

37. In a device for automatically maintaining a predetermined liquid level with an air space above it in a pressure tank, the combination of a magnet, an armature actuated by said magnet, a control member operated by said armature and a magnetic needle also operated by said armature to indicate the relative movement and position of said magnet.

In testimony whereof I affix my signature.

HERBERT HASTINGS.